(12) United States Patent
Lomet

(10) Patent No.: US 7,430,559 B2
(45) Date of Patent: Sep. 30, 2008

(54) GENERALIZED IDEMPOTENT REQUESTS

(75) Inventor: David B. Lomet, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 391 days.

(21) Appl. No.: 11/232,397

(22) Filed: Sep. 21, 2005

(65) Prior Publication Data

US 2007/0067266 A1    Mar. 22, 2007

(51) Int. Cl.
*G06F 17/00* (2006.01)
(52) U.S. Cl. .................. 707/101; 707/102; 707/103 R; 707/104.1
(58) Field of Classification Search ............ 707/1–10, 707/100–104.1, 200–206
See application file for complete search history.

(56) References Cited

U.S. PATENT DOCUMENTS 4,807,118 A * 2/1989 Lin et al. ..................... 709/237
2004/0117453 A1 * 6/2004 Cheng et al. ................. 709/212

OTHER PUBLICATIONS

U.S. Appl. No. 11/179,836, filed Jul. 12, 2005, David B. Lomet.
D. Lomet, "Robust Web Services via Interaction Contracts", TES'04 Workshop, 2004, 15 pages.
R. Barga, et al. "Recovery Guarantees for Internet Applications", ACM Transactions on Internet Technology, Aug. 2004, 289-328.
R. Barga, et al. "Improving Logging and Recovery Performance in Phoenix", App. ICDE Conference, Boston, MA, Mar. 2004, 486-497.
R. Barga, et al. "Persistent Applications Via Automatic Recovery", IDEAS Conference, Hong Kong, Jul. 2003, 258-267.
G. Shegalov, et al. "EOS: Exactly-Once E-Service Middleware", Proceedings of the 28th VLDB Conference, Hong Kong, China, Aug. 2002, 1043-1046.
R. Barga, et al. "Phoenix Project: Fault-Tolerant Applications", SIGMOD Record vol. 31, No. 2, Jun. 2002, 94-100.

(Continued)

*Primary Examiner*—Isaac M Woo
(74) *Attorney, Agent, or Firm*—Amin, Turocy & Calvin, LLP

(57) ABSTRACT

A system and methodology that facilitate persistence for an execution state is provided. The system and methodology employ generalized "idempotent" request(s) that have the property they only execute a request once, and always return the result of that first execution should the request be repeated so as to ensure exactly once execution. A calling middle tier component can exploit these procedures so that it can engage in exploratory reads (which are not idempotent) yet still be able to have their state recovered via replay based on the log at the client and the results retained by the generalized idempotent procedures provided by back end services. The system and methodology can be employed to facilitate successful replay of logless persistent component(s), (e.g., components that do not themselves log any information).

To exploit generalized idempotent procedures, what a middle tier logless component can do with the results of non-idempotent exploratory reads must be circumscribed so that these results only impact arguments to the next generalized idempotent procedure invoked from the middle tier.

Optionally, the system and methodology can facilitate idempotent procedure(s) which support idempotent request abort(s). When an idempotent request abort is requested, it can be identified with the request via a request identifier. Then subsequent request(s) with the same request identifier can return with the same "abort" message.

14 Claims, 6 Drawing Sheets

OTHER PUBLICATIONS

R. Barga, et al. "Recovery Guarantees for Multi-tier Applications", Proceedings of the ICDE Conference, San Jose, CA, Mar. 2002, 543-554.

D.B. Lomet, et al. "Efficient Transparent Application Recovery in Client-Server Information Systems", ACM SIGMOD Conference, Seattle, WA, Jun. 1998, 460-471.

S. Frolund, et al. "A Pragmatic Implementation of e-Transactions", 19th IEEE Symposium on Reliable Distributed Systems, 2000, 186-195.

S. Frolund, et al. "e-Transactions: End-to-end Reliability for Three-tier Architectures", IEEE Transactions on Software Engineering, vol. 28m No. 4, Apr. 2002, 378-395.

S. Frolund, et al. "Exactly-Once Transactions.", HP Lab Tech Report HPL-1999-105, Sep. 22, 1999, 27 pages.

S. Frolund, et al. "Implementing E-transactions with Asynchronous Replication", IEEE Trans. on Parallel and Distributed Systems, vol. 12, No. 2, Feb. 2001.

A. Borg, et al. "Fault Tolerance Under UNIX", ACM TOCS, vol. 7, No. 1, Feb. 1989, pp. 1-24.

P. Bernstein, et al. "Implementing Recoverable Requests Using Queues", SIGMOD 1990.

P. A. Bernstein, et al. "Principles of Transaction Processing", Morgan Kaufmann, 1996.

E.N. Elnozahy, et al. "A Survey of Rollback-Recovery Protocols in Message-Passing Systems", ACM Computing Surveys, vol. 34, No. 3, Sep. 2002, pp. 375-408.

D. Lomet, "Persistent Middle Tier Components Without Logging", IDEAS Conference, Montreal, Canada, Jul. 2005, 10 pages.

J. Gray, et al. "Transaction Processing: Concepts and Techniques", Morgan Kaufmann, 1993.

\* cited by examiner

GENERALIZED IDEMPOTENT REQUESTS

BACKGROUND

With respect to enterprise software, robust applications are those that, when deployed, are capable of providing enterprise systems with highly available and highly scalable service. Such applications must be able to survive system crashes, permit flexible re-deployment on other computers as the system changes and particularly, as the system grows. The semantic requirement for robust applications is that, despite all this dynamic activity, including system crashes, it provides "exactly once" execution semantics. Such an application may start execution on one computer, that system crash, be redeployed on another, etc., and to the application client, it appears like a seamless execution in which the application executed exactly once without crashing or moving, etc.

Application developers naturally tend to let the business logic of the application dictate how the program is structured. This natural programming style has, in the past, interfered with enterprise system requirements for high availability and scalability. An application written in this "natural" way may retain control state necessary for correct and successful execution across transaction boundaries—a "stateful" application. The problem with stateful applications is the risk of losing state when the system on which they execute crashes. This can result in a "semantic mess" that requires human intervention to repair or restart the application, resulting in long service outages.

The classic transaction processing response to this problem is to require that an application be stateless—meaning that no meaningful information is retained across transactions. However, stateless applications force a rather unnatural "string of beads" style of programming where an application must, within a transaction, first read its state from, e.g., a transactional queue, execute its logic, and then commit the step by writing its state back to a transactional queue for the next step. Note here that "state" is not so much avoided as it is made the responsibility of the application program to manage it in a transactional way. Potential performance and scalability problems related to the message and logging cost of two phase commit (2PC) may also be encountered.

Thus, conventionally a system builder is faced with a dilemma and has to choose between either: fast and easy development (resulting in applications that are more likely to be correct applications, implemented in a natural stateful programming style, but which fail to provide availability and scalability), or the high availability and scalability of the stateless programming model (which adds to development time and where correctness is more difficult to achieve because of the intrusion of additional concerns of explicit state management.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A system and methodology that facilitate persistence for an execution state is provided. The system and methodology make use of a generalized definition of "idempotent" execution. Traditionally, "idempotent" execution has meant the execution produces the same outcome, regardless of how many times the execution is repeated. This permits replay of this execution to be done without altering the outcome. It is an essential part of reliable computing, where it is frequently not known whether an earlier execution occurred or completed successfully. It permits the execution to be retried, without compromising the outcome. The system and methodology described here permit subsequent executions to vary from the original execution in what is read leading up to the idempotent request, and upon which some of the arguments of the idempotent request are dependent, so long as all persistent changes made by the execution occur as a result of executing the same set of requests with the same request identifiers at the same services across all executions, even though other arguments for these requests may differ.

One way to exploit such a generalized notion of idempotence is via "exploratory" procedure(s) that have the property that their final action is a generalized idempotent request to a service, regardless of the results returned from exploratory and hence non-idempotent read(s), if any, in the procedure. This final action, regardless of the number of times it may be replayed, is only required to have the same request identifier on each replay. Other arguments to the interaction can be different. The system and methodology can be employed to facilitate successful replay of logless persistent component(s). For example, such a procedure may play the role of a middle tier object's method. If all of the object's methods that read system state in non-idempotent interactions produce state changes only within exploratory procedures, and the subsequent execution of the middle tier method depends only on results returned by the generalized idempotent requests, then persistent components without logging can be realized.

By employing exploratory procedure(s), logless components can be implemented that, for example, check the prices of airline tickets and decide which flights to choose based on that price via exploratory procedure. Further, even if during replay (after a system crash), the prices have changed, nonetheless, the action taken is the same one as was originally executed, and the result returned by the exploratory procedure is the same as had the crash not occurred. Thus, even though the exploratory procedure includes non-idempotent activity within it, its execution is idempotent, both in the state that it changes and the results that it returns.

The web service providing the new form of generalized idempotent request may include a result store that stores a result associated with a transaction or other request. If a result for the request or transaction has been previously stored in the result store, the generalized idempotent request provides the stored result as its result, independent of any parameter(s) provided to it that may result from exploratory read(s) of a request-issuing exploratory procedure. The particular request or transaction can be identified, for example, by a request identifier (e.g., request ID). The web service can be a component of a "back end" data tier and interact with logless component(s) of a middle tier of an enterprise application architecture.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed subject matter is intended to include all such aspects and their equivalents. Other advantages and novel features of the claimed subject matter may become apparent from the following detailed description when considered in conjunction with the drawings.

DETAILED DESCRIPTION

Figure 1:
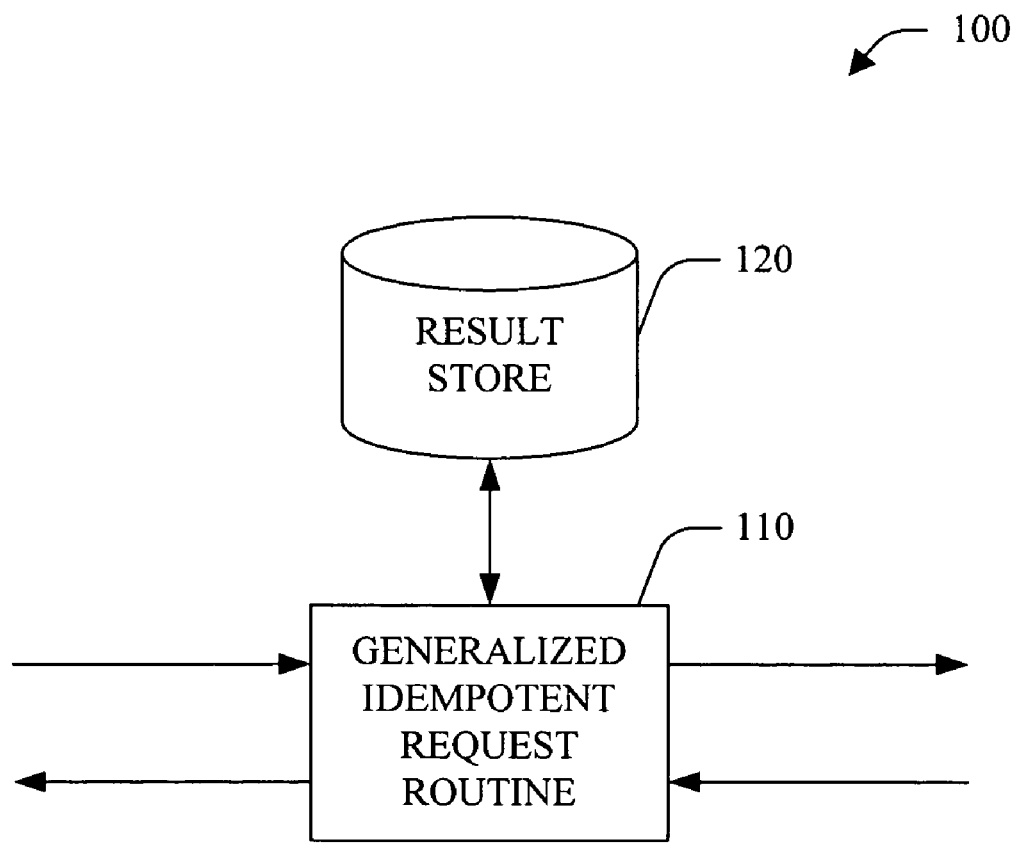
FIG. 1 is a block diagram of a system that facilitates persistence for an execution state.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "handler," "model," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). Computer components can be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the claimed subject matter. The term "method" in the context of the execution of components is used as in object oriented programming. That is, it denotes a procedure (usually one of several) that is externally visible to client components, and which may be invoked by clients.

Traditional idempotent interactions (ones where all the arguments are precisely the same for all replays of the interactions) can be employed with logless component(s) (LLcom(s)) to facilitate persistence in the middle tier without the middle tier component(s) needing to log interactions. When each interaction initiated by the LLcom for a service is "idempotent", persistence can be provided without logging. That is, should the overall system crash, the component state will be lost. To rebuild the state, the component needs to be re-created (functionally) and replayed. The same interactions must be encountered as in the original execution. And, that interaction must be replayed idempotently—meaning that no matter how many times it is replayed, the result is as if it executed only once.

The characteristic above for idempotence places a strenuous requirement on the service being called. This requirement is acceptable, for example, for a final "sale" that completes some business arrangement and "commits" the result. However, it can be restrictive and expensive for preliminary interactions leading up to the "sale". Yet these preliminary interaction(s), which are frequently read only, affect the course of the execution. If these preliminary interaction(s) are not idempotent, then on replay, the interaction can return a different result. No state change is made at the service, but the state of the LLcom persistent component can diverge from that of its original execution.

Figure 2:
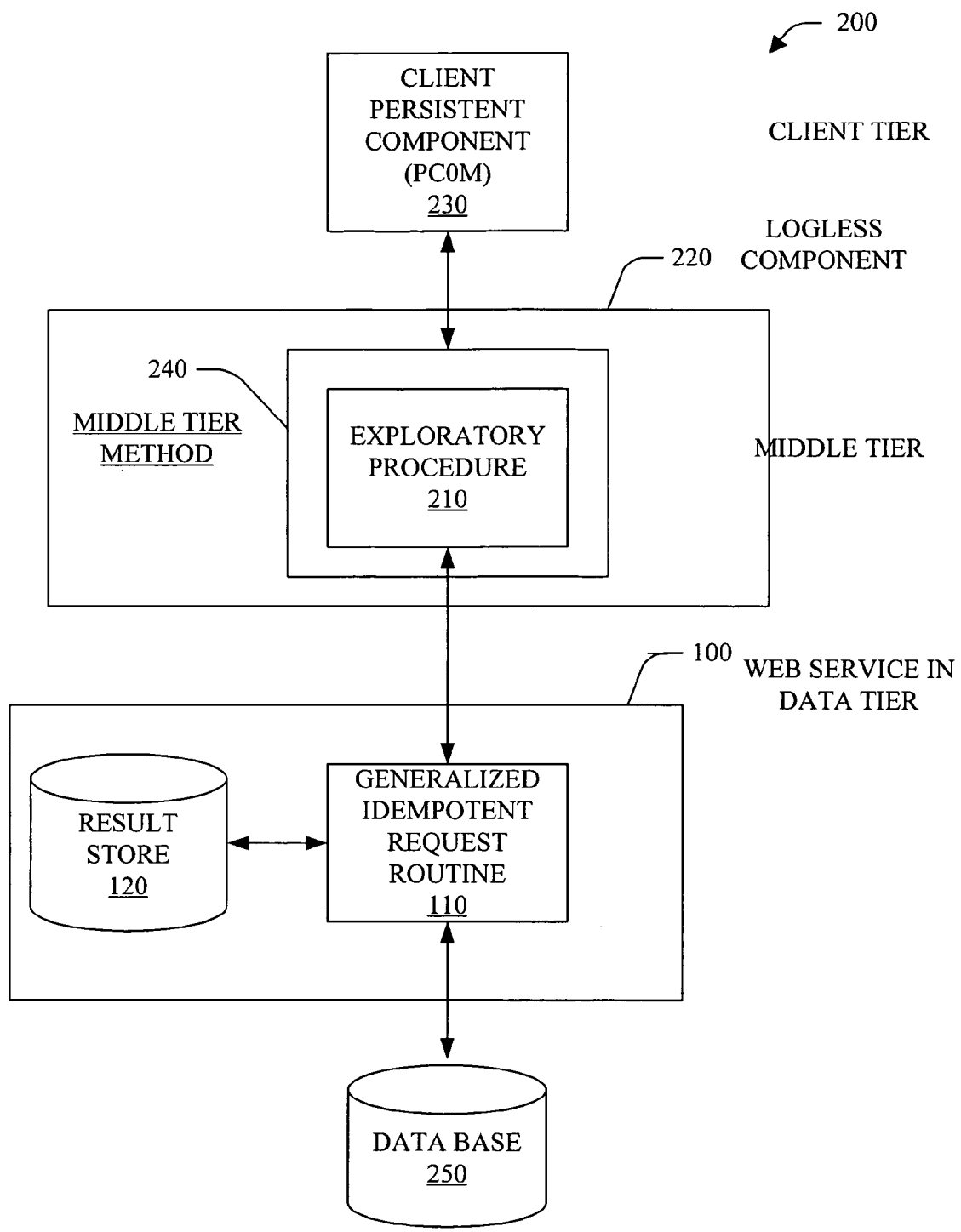
FIG. 2 is a block diagram of an enterprise architecture.

Referring to FIGS. 1 & 2, a system 100 that facilitates persistence for an execution state is illustrated. The system 100 can be part of a web service of an enterprise architecture 200. The system 100 employs an idempotent request routine 110 that has the property that it supports generalized idempotent interaction requests, as discussed herein. A middle tier logless component 220 can execute a method (procedure) 240 that performs exploratory reads within exploratory procedures 210. Then, regardless of the results returned from exploratory read(s), if any, the system 100 can be employed to facilitate successful replay of logless persistent component(s) 220 (e.g., middle tier component(s)).

The architecture 200 can further include a client persistent component (PCOM) 230 that does use logging to capture user interactions and its requests to the middle tier component (e.g., logless component 220). The logging at the PCOM 230 captures the non-determinism introduced by the user and, with respect to the middle tier component, it captures the sequence of method calls to the middle tier component. A persistent middle tier component can be considered as a persistent object. The client requests to this component can be referred to as middle tier (MT) method calls. The middle tier component is unable to capture this sequence of MT method calls without logging. But it can exploit the logging done at the PCOM 230 for this. Note that the logging at the PCOM 230 is required, in any event, to enable the client to be persistent.

The architecture 200 further includes the system 100 (e.g., back end services) that support generalized idempotent service requests referred to as I-request(s). The system 100 (e.g., back end services) can provide idempotence, for example, by storing requests and associated replies on persistent queue(s). They can also provide idempotence via an application remembering prior requests (e.g. order numbers) and associating these requests with database state. This functionality can be useful for answering inquiries about, for example, the orders, while also providing idempotence. Idempotence is generally required in any event for these services, even in situations where the middle tier component does logging. The problem this solves is that the middle tier component may make a request and then fail. The only way for it to ensure exactly once execution of its request is to make the request again, relying on idempotence to give it the required single execution.

By exploiting exploratory procedure 210 within method(s) 240, logless components 220 can be implemented that, for example, check the prices of airline tickets and decide which flights to choose based on that price. via exploratory procedure. Further, even if during replay (after a system crash), the prices have changed, nonetheless, the action taken is guaranteed to be the same one as was originally executed, and the result returned by the idempotent request routine 110 is the same as had the crash not occurred.

The system 100 includes a result store 120 that stores result(s) associated with transaction(s) and/or requests. For example, result(s) associated with transaction(s) can be stored based on a unique request identifier.

The system 100 further includes the idempotent request routine 110 invoked, e.g., for a particular transaction. The logless component method 240 interacts with the service 100 via an exploratory procedure 210, and, if a result for the particular transaction or request has previously been stored in the result store 120, the result stored in the result store 120 associated with the particular transaction is returned to the logless component 220 (e.g., result first successfully completed execution) executing the exploratory procedure. Consider a request $R(A_1)$ to some backend service, where $A_1$ denotes the entire collection of request arguments, including potentially hidden arguments. If that request is not idempotent, then should it be executed more than once, the result will be different from when the request is only executed once. That is $$R(A1) \neq R(A_1) \circ R(A_1)$$

where "$\circ$" denotes the composition of the two executions.

As indicated previously, the system 100 can support idempotent requests (I-requests) $IR(A_1)$. This facilitates exactly once execution by permitting submission of a request multiple times until word has been received that the request has actually been received and processed. Thus:

$$IR(A_1) = IR(A_1) \circ IR(A_1)$$

By induction, this means that any number of submissions of IR(AL) requests have the same result as a single submission, once the request has been executed at least once.

To provide a more generalized capability—generalized idempotent requests or GIR—the set of arguments for GIR requests is divided into two parts, the request identifier part $I_1$ and the other argument(s) $A_1$. For a GIR request, it is only required that the identifier part be the same, and permit the other arguments to be different. Thus:

$$GIR(I_1, A_1) = GIR(I_1, A_2) \circ GIR(I_1, A_1)$$

where the order of execution of the composed operations on the right hand side is from right to left. Thus, so long as the GIR request is identified by the same identifier arguments $I_1$, it will provide the same effect, both in terms of state change and response, no matter how many times it is subsequently invoked, and even if the other arguments $A_x$ are different from the arguments $A_1$ of the initial execution.

Only the first request identified by $I_1$ will be executed and its effect on the state and return results will be governed by the values of its other arguments, in this case $A_1$, of the request. So, no matter how many times a GIR request is resubmitted, it will only be executed once, and the first successful execution will determine what happens, independent of the subsequent arguments $A_i$ that are submitted during re-requests.

With respect to a logless component method 240 that performs exploratory querying within an exploratory procedure 210 that makes a generalized idempotent request in which a sale is consummated, the entire set of interactions can be treated as an idempotent set without making each interaction within the exploratory procedure (including read(s)) idempotent in isolation. The exploratory procedure 210 accomplishes this by invoking a final generalized idempotent interaction, for example, where regardless of the answers returned by exploratory read(s) and/or parameter(s) passed to the idempotent request routine 110 (other than the request identifier), the result is as if the request was executed exactly once, with the argument values as determined by the initial successful execution.

In this example, the final action has two properties. First, the request for the action (from the LLcom 220) is identified by a request identifier that is deterministically fixed at the time the exploratory procedure 210 of the method 240 is first invoked. This request identifier does not depend in any way upon the results returned by any non-idempotent exploratory read interaction(s) leading up to the final action. Second, the request identifier is sufficient for idempotent execution of the final action. The request, in general, has parameter(s) that describe the transaction (e.g., a proposed "sale"). For example, the request at a travel web site describes the desired flights, where the flights were selected based on the exploratory reading earlier in the procedure. On replay, the exploratory reading of the procedure might result in a different set of flights. The request identifier must, by itself, be sufficient to identify and return the results of its original execution (based on the original request parameters from the first successfully completed execution) even though the replay request may involve different flights.

For the logless component method 240 to be idempotent using this technique, the generalized idempotent request must always be executed, even when, for example, there may be no flights that are suitable during original execution. The request, in this case, would simply record that no flights were purchased. While this is extra work for the service 100 being called, it is substantially less work than requiring the service 100 to make each of its reads idempotent.

Those skilled in the art will recognize that the definition for generalized idempotence is not the ordinary definition of idempotence. A replayed request might have different arguments during the second or later execution. The request must return the same result as the original execution, even when these arguments are different. That is, the request is idempotent with respect to the request identifier, but not with respect to the other arguments.

Impact of GIR Requests on the Middle Tier

The GIR treatment above permits the logless component 220 (e.g., middle tier component) to explore via issuing non-idempotent reads, parts of the system state, yet always get the effect that was provided by the initial successful execution, where the GIR request is identified by the identifier part of the arguments I. By being careful about its state and where the exploratory results can have impact, the middle tier component can ensure successful "replay" of the stable part of its execution even in the presence of these non-idempotent reads.

To understand how middle tier components can exploit GIR requests, the state of these components can be characterized as follows. It needs to be ensured that the middle tier component's state is determined by the sequence of GIR requests that it has executed and by the exploratory activity following the last GIR request in the sequence of executed requests. However, once a GIR request has been executed, where the $A_x$ arguments can be determined by the entire state (GIR sequence plus final exploratory activity), it is required that the preceding exploratory activity no longer impact the subsequent execution of the component. The exploratory activity must be captured via the GIR request that immediately follows it.

Thus, after i GIR requests, a component's state is determined by $(GIR_1, \ldots, GIR_i, Exp_{i+1})$. This means that the component can be replayed, and even when the exploratory activity $Exp_j$ for $j \leq i$ differs from the original execution (which is surely possible, since the exploratory activity is not idempotent), nevertheless, the stable part of the state (the sequence of GIR's) will remain the same. The exploratory behavior may differ on replay, and hence the arguments $A_x$ may differ, but this will not change the resulting state of the middle tier components as produced by the GIR requests.

Finally, in this example, there is one more restriction. The next GIR request (e.g., the specific request $GIR_{i+1}$ and its request identifier $I_{i+1}$) in the GIR request sequence must depend only on the stable state (e.g., the sequence of prior GIR requests). It cannot depend on the exploratory activity. Thus, the exploratory activity must only affect the $A_x$ arguments of the GIR requests. Any further impact that this exploratory activity may have has to be the results of changing the result returned from the GIR requests. This requirement ensures that the sequence of GIR requests can be recreated, even when the exploratory activity results in differing $A_x$ arguments. It means that only the result of the first successful executions of GIR requests (and thus the first exploratory activities that lead to this first successful execution) determine the subsequent execution path of the component.

Request Aborts

Another difficulty with respect to logless persistent component(s) 220 can be encountered in the event that a request with at a backend service abort (encountering an occasional abort is unavoidable). A request may involve a transaction where the transaction's effects are undone by abort, or perhaps a workflow, where the results are undone by a compensating action. Aborts are described in the sequel in terms of transaction aborts, but it should be understood that other forms of abort are also possible within a backend service.

Aborts are usually not idempotent. If a transaction aborts, only a best effort is made to notify the program that issued the transaction. This may fail. Even if it succeeds, a subsequent re-execution of the same transaction will not be locked into receiving the exact same abort message. Indeed, this can be a desirable feature. An abort may trigger activity for resubmitting the request in the hope that it will successfully commit upon re-execution.

Not only are aborted transactions not usually idempotent, but all effects that have happened at the back end service as a result of the abort are removed. An aborted transaction does not change state at the back end service. Hence, transaction aborts can be treated as exploratory activity. The middle tier component can respond by resubmitting the exact same request, or perhaps, should that fail also, by submitting a somewhat altered request. If each of these resubmissions uses the same request id (transaction id), then the system 100 can treat these as it would any replay of a GIR request. That is, the first successful execution (commit) becomes the defining execution of the GIR request.

Treating aborts as part of exploratory activity permits the middle tier component to respond programmatically to an abort. Not only can it resubmit the original request unchanged, but it can decide to change things as a result of the error message that it receives. So the persistent middle tier programs that do not require logging can respond programmatically to aborted transactions, at least in a limited way. But they cannot abandon the transaction entirely. The regime here requires that there eventually be a successful execution of a transaction carrying the request id that was initially provided.

The requirement for eventual successful execution of the transaction limits one's ability to deal with transaction failures. It means that one needs to continue to execute the GIR request with the given request identifier until the transaction associated with the request "works". It provides no way to abandon the effort and proceed to a new GIR request, perhaps to a different back end service, and having a different request identifier.

Abandoning a request would not guarantee the ability to replay the middle tier component. Consider a case where a middle tier component has met with failure at back end service A and proceeds to submit a request (successfully) at back end service B. A crash of this middle tier component, followed by a replay of the component would reach the point where the request to service A would occur. Now, during replay, the request may succeed, leading perhaps to never submitting a request to service B. Replay has failed.

Thus, in this example, it is essential that every GIR request eventually be idempotent, before the application "moves on". One way to achieve this while abandoning aborted requests is to provide a way in which to request that an abort be made idempotent. Once the request is idempotent, whether the result is commit or abort, the application can move on to submission of subsequent GIR requests. This facility to request an idempotent abort can be used, for example, as follows. The middle tier component submits a request (not asking for idempotent abort), and may do that multiple times in an effort to reach a successful commit, perhaps changing some of its $A_x$ arguments as it continually tries for success. This permits multiple attempts to be possible. At some point, the decision is made to abandon the effort. At this point, the middle tier component can submit a request along with an indication that it wants an idempotent abort should the transaction fail. There remain cases when such idempotence will not be the result (e.g., service crash, communications failure) but otherwise it is possible for the back end service to make the abort idempotent, returning a result message indicating that idempotence was achieved and whether the transaction committed or aborted. Now the application can move on, since the request has been captured at the back end service and the "successful" execution will reliably report the transaction abort on replay.

Should the abort not be idempotent, even though the middle tier component requested idempotence, the request must be resubmitted until idempotence is achieved. So long as services come back up eventually and communications failures are not permanent, eventually idempotence will be achieved.

Thus, in summary, the issue with respect to transactional aborts is how the LLcom 220 deals with the abort. Typically, the service 100 does not remember the abort. There is no state change at the service 100 (e.g., commit), so the issue is not that the service 100 might do the transaction twice. Rather, the issue is that the original execution path involved an abort, and the subsequent path on replay may result in a commit. In this case, the LLcom 220 replay would not re-create the same state, and the LLcom 220 might go on to do subsequent activities completely different from the original execution.

As noted above, the problem is not that aborted transactions make state changes. They do not (at least not usually). In this sense, aborted transactions are like reads. That is, upon re-execution, one is not assured of the same result. Thus, a transaction that aborted originally may commit when replayed. Or it might abort again, but for a different reason and with a different error message. Aborted transactions make replay after the interaction problematic.

When a transaction eventually commits, it has done the needed idempotent operation, at least when the interaction satisfies a "transaction interaction contract". And the request identifier is deterministically fixed at the time the exploratory procedure 210 in the middle tier method 240 is invoked. That is, the request identifier does not depend upon reproducing the earlier transaction abort(s).

Accordingly, optionally, the generalized idempotent request routine 110 can employ a result status parameter to facilitate idempotent transactional abort(s). The exploratory procedure 210 within the logless component method 240 can treat aborted transaction(s) as idempotent. That is, the exploratory procedure requests that the abort be made "idempotent." When this request succeeds, for execution following the transaction abort, the logless component method takes the same path on replay as it did for the original execution.

Since idempotence for aborts can be both expensive and unnecessary, in one example, idempotence transaction abort(s) can be selectively enabled. Thus, an idempotent transaction abort can be based upon a request (e.g., from the logless component 220). When an idempotent transaction abort is requested, it can be identified with the transaction via the request identifier. Then subsequent request(s) with the same request identifier return with the same "abort" message. And this abort message is the basis for what is returned for subsequent execution by the logless component 220. This permits the transaction to be tried multiple times, should an abort be encountered, each of these aborts being of the "non-idempotent" variety that leave the database state unchanged, in an effort to commit the transaction. If there are multiple unsuccessful attempts, an exploratory procedure 210 can make one final request, including the parameter indicating that, on abort, the abort is to be made idempotent.

In one example, in order to facilitate idempotent transaction abort(s) with generalized idempotent requests(s) 110, two parameters are employed. First, a request identifier is used to identify the transaction request. If a prior execution is found by the backend server executing the generalized idempotent request 110 being invoked, then it is obligated to return in the output parameter(s), the same result as produced by the original execution, even when other parameters are different, as discussed above. Second, a result status parameter permits a caller to request that should the transaction involved abort, that the abort should be stable and idempotent. When this is not required, the caller can set the result status parameter to "volatile". If the request committed, then the called GIR request sets the result status parameter to stable. If the request aborted, and the input state of the result status parameter is volatile, then there is no obligation for the GIR request routine 110 to remember the request. However, if the caller has set the result status parameter to stable, then the GIR request routine 110 must ensure that the request result is stable, even if the request aborted.

An example invocation is set forth below:
Call MT-request(request_id, result_status, other parameters, result);

Which can be employed, for example, with the following code sequence:

```
result_status <- volatile;
count <- 0;
While (result_status = volatile)
    count <- count + 1;
    // transaction must have aborted if result is volatile,
    else result would
    be stable //
    If count >= 10 then result_status <- stable;
    Call GIR_service_request(request_id, result_status,
    other parameters);
End while;
```

This code sequence tries for ten attempts to execute the GIR request 110 or interaction for the given request_id. If the first nine of the attempts have resulted in aborts (which are not remembered and hence are not idempotent), then on the tenth attempt, the request routine 110 is required to return an idempotent abort should the transaction again fail. That is, the backend service 100 needs to log that the request has aborted and reliably return the abort information on any subsequent calls via the idempotent request routine 110.

Continuing with this example, assume that the LLcom 220 in which this code sequence is embedded should crash. Then, of course, the entire code sequence is started again as part of replay. There are three cases to consider for this replay.

First, the interaction produced a commit during the pre-crash execution. As commits are idempotent and stable, the very first invocation of GIR_service_request on replay produces a result_status that is stable. The other parameters presumably indicate that the action has committed and produced the desired effect. This causes the while loop to execute only once and then exit, with the commit information available in the other parameters.

Second, the interaction produced an abort after failing to commit for ten consecutive attempts. The last invocation had set the result_status to "stable". Hence, on replay, the "while" loop executes only a single invocation, and then exits, since the tenth try in which an abort occurs produces an idempotent (stable) result. In this case, the abort information is available in the other parameters.

Third, the interaction may have aborted, but the abort is not stable. This causes the loop to be re-executed for up to ten times in an attempt to once again reach a stable outcome.

Persistent State of the Logless Component 220

With regard to the logless component 220 of the middle tier, the state of a logless component 220 includes two parts, the stable state and the volatile state. The volatile state is derived from the stable state via subsequent execution from the last stable state.

The stable state can be determined completely by its sequence of generalized idempotent actions and initiating client input (e.g., received from a persistent component 230 of the client tier). This permits avoidance of logging for a logless component 220. The results of idempotent actions are guaranteed to be persistent by the backend service(s) 100. The initiating client input is persistent because it comes from the persistent component 230, which guarantees that its output message(s) are persistent, for example, either by logging or via replay.

Significantly, the stable state cannot be a function of any read(s), which are, of course, not idempotent. With exploratory procedures 210 within its method(s) 240, logless component(s) 220 of the middle tier can issue read(s) yet provide recovery without logging.

On initial execution of an exploratory procedure 210, the idempotent action performed at a service 100 (e.g., backend server) may be impacted by preceding read interaction(s). The important property of replay for these routine(s) 110 is that even if read(s) are replayed and produce different results, the result of executing the GIR request (determined solely by the request identifier) is unchanged. Hence, because the logless component 220 state is determined only by the sequence of idempotent action(s) and client input, the stable state is guaranteed to be recreatable via replay.

The volatile state is uncommitted state and hence need not be preserved. Only when the next idempotent interaction (with persistent client component 230 and/or with idempotent service 100) is reached is the state committed, at which point it becomes persistent (via replay).

Middle Tier Methods(s) 240

Execution of a logless component 220 can include more than a single idempotent action. It may include a sequence of idempotent action(s) that are parts of method call(s) made by the client, where the result returned by a method on replay is a function only of this sequence of idempotent actions. While the initial successful execution may use the results of read(s) to change the course of execution, the sequence of requests (and their identifiers) is unchanged during replay—though the arguments for the calls may be different on replay. Further, this sequence is determined solely by preceding idempotent action(s)/call(s) and client persistent component 230 input. Essentially, each method invocation changes the stable state by appending its sequence of stable (idempotent) actions to the sequence of actions present at the time of its call.

A significant property of procedures is that subsequent execution at their caller is not dependent upon the internal state of the procedure. Rather, it depends only on state that has been "exported". In one example, that state can be limited to the returned output parameter(s)—and the output parameters can be made to depend only on the returned values for an ending GIR interaction (e.g., be enforced syntactically and/or followed by convention).

An important attribute of such a middle tier method 240 is that it itself is idempotent. It can be invoked any number of times with the same arguments and the result is as if it executed once. And this is despite the fact that the control flow path within it for each execution might be different. Only the idempotent result of transaction or service requests affects future state. So execution at the caller level, is replayable because the method itself is idempotent, even though its intermediate states are not repeatable.

Exemplary Syntax for Middle Tier Methods 240

Syntactic constraints can be employed to ensure that the sequence of idempotent action(s) is preserved on replay. Two example syntactic restraints, (1) step-oriented, and, (2) exploratory procedures are discussed below.

Middle Tier Methods (Step-Oriented)

A step-oriented logless component method 240 comprises a series of step(s), with no conditional flow between these steps. Thus, in this example, the steps are always executed, and always in the same order.

Each step has two sub-steps. The first sub-step, the "Exploration" sub-step, is permitted to contain arbitrary logic and to examine arbitrary information sources, but it is not permitted to engage in any update activity. It can, however, update local variables.

The second sub-step, the "Action" sub-step, can make use of local variables to set parameter(s) in an invocation of an idempotent interaction (e.g., single GIR request). It can also include code sequence(s) including transactional abort sequence(s) as discussed above. However, in this example, an action sub-step must execute exactly one idempotent interaction, and the name of the service being invoked, and the request identifier being used depends only upon the containing logless component method invocation 240 and the number of the step, and does not depend on the values of any other variable(s) of the component, though other parameters of the invocation can, and usually will, depend upon the results of activity in the exploration sub-step.

In this example a middle tier method 240 can syntactically be illustrated as set forth in Table 1:

TABLE 1

Method: MT_procedure(request_id, <other parameters>)
    Some declarations
    Step 1:
        Exploration:
            Arbitrary program logic,
            including reading of external system state
            But no updating of system state.
            And no ability to branch around the Action part.
        Action:
            Idempotent action invocation
    ...
    Step N: Exploration: ...
        Action: ...
    Return-Step: activity leading up to a return statement, where the
            only variables referenced have "method" scope.
    End-MT_procedure This syntactic construct enforces that the sequence of idempotent actions is the same in every replay of Method. The arbitrary program logic in exploratory sub-steps reading external state can impact the parameters of the idempotent action invocation. But they cannot avoid the invocation. Further, the initial execution of this action differs from replay in that the parameters during replay are ignored if the action has already been executed. In that case, only the request identifier (which can be the procedure execution name deterministically created during its call, together with the step number) determines what results are returned. Only the original successful execution of the action is impacted by the value of the parameters in the call. This syntactic construct has the advantage of simplicity and understandability.

Those skilled in the art will recognize that other syntactic constructs can be employed to facilitate middle tier method(s) 240. All such syntactic constructs are intended to fall within the scope of the hereto appended claims.

Finally, a middle tier method 240 must produce a result, written into its output parameter(s), that depends only on the results produced by the idempotent actions that were executed, and not on the exploration activity. One way to do this is to designate certain variables as having "method" scope, and to be updatable only based on the values of the output parameters of the idempotent actions. Thus, a return action only depends on the stable state, that is, upon the sequence of idempotent actions performed by the preceding steps.

This approach has some advantages in that it provides "structural guidance" in how to write programs which replay the same idempotent calls in the same order as during the original execution, yet permits the original execution to be influenced by an ability to read external state.

Exploratory Procedures

A characteristic of procedures is that variables of their local scope disappear when the procedures terminate. The same thing happens to the "step" approach discussed above. However, procedures can be used more flexibly than with steps in the step oriented approach. In this example, it is once again required that all exploratory activity be enclosed in an exploratory procedure 210.

An exploratory procedure has a special syntactic structure. It consists of two parts, much like the step above. The first part is the exploratory part, and the second part is the GIR request, though such a strict separation is not required. What is required is that the GIR request be the last thing executed in the exploratory procedure. Its output arguments are permitted to be variables in the outer scope of the component. Alternatively, its output arguments can be returned as output arguments to the middle tier method 240. But no other exploratory procedure actions are permitted to modify variables outside of the exploratory procedure scope.

At the outmost scope of the middle tier component 220, all variables are determined either by the input arguments to MT-method calls or by the output arguments of a GIR request, executed either within an exploratory procedure or directly in the outer scope (and hence without any exploratory activity). An MT-method call can now have various kinds of conditional executions, including loops and if statements. The set of GIR requests need not be specified when the program is written, unlike in the step oriented approach. Rather, the MT method call can compute the order of GIR requests it will make as it goes along, based on the variables in its scope or in the scope of the component. This is much more flexible than the step oriented approach.

Note that the exploratory procedure is required to execute a single GIR request, and that GIR request is determined outside of the exploratory procedure. Either it is fixed, or it can be a function of the input parameters of the exploratory procedure. The exploratory activity cannot alter which GIR request is made, only the $A_x$ arguments of the request. But the surrounding outer scope code of the MT method can, via control flow, select which exploratory procedure invocations to make and in what order. Because exploratory procedure 210 executions are idempotent, and the control flow at the level of the middle tier method 240 depends only on the results of the enclosed GIR requests, the result is an idempotent execution of the middle tier method.

It is to be appreciated that the system 100, the idempotent routine 110, the result store, 120, the architecture 200, the service 100, the logless component 220, the middle tier method 240, the exploratory procedure 210, the client persistent component 230 and/or the database 250 can be computer components as that term is defined herein.

Figure 3:
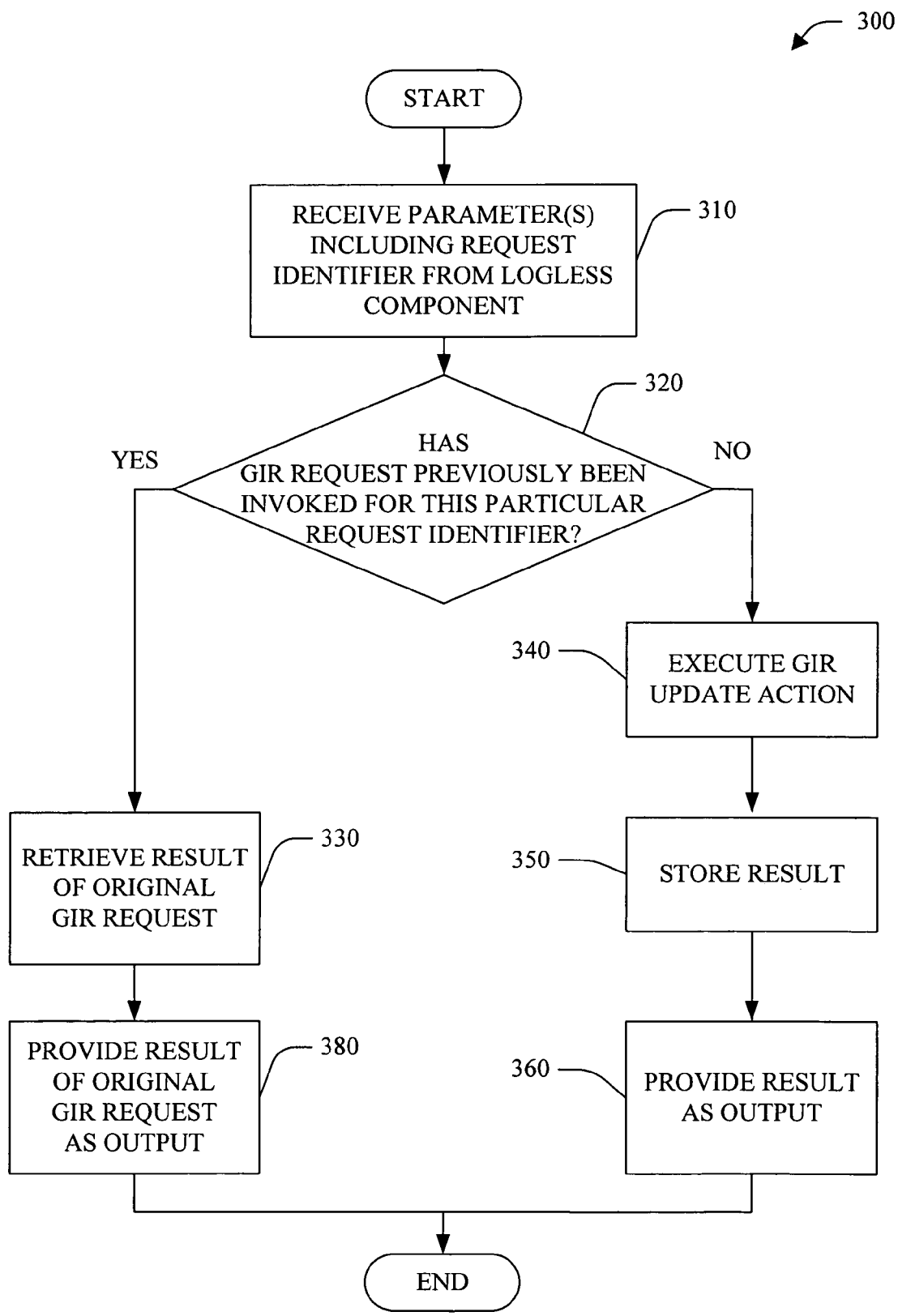
FIG. 3 is a flow chart of a methodology that facilitates a generalized idempotent request.
Figure 4:
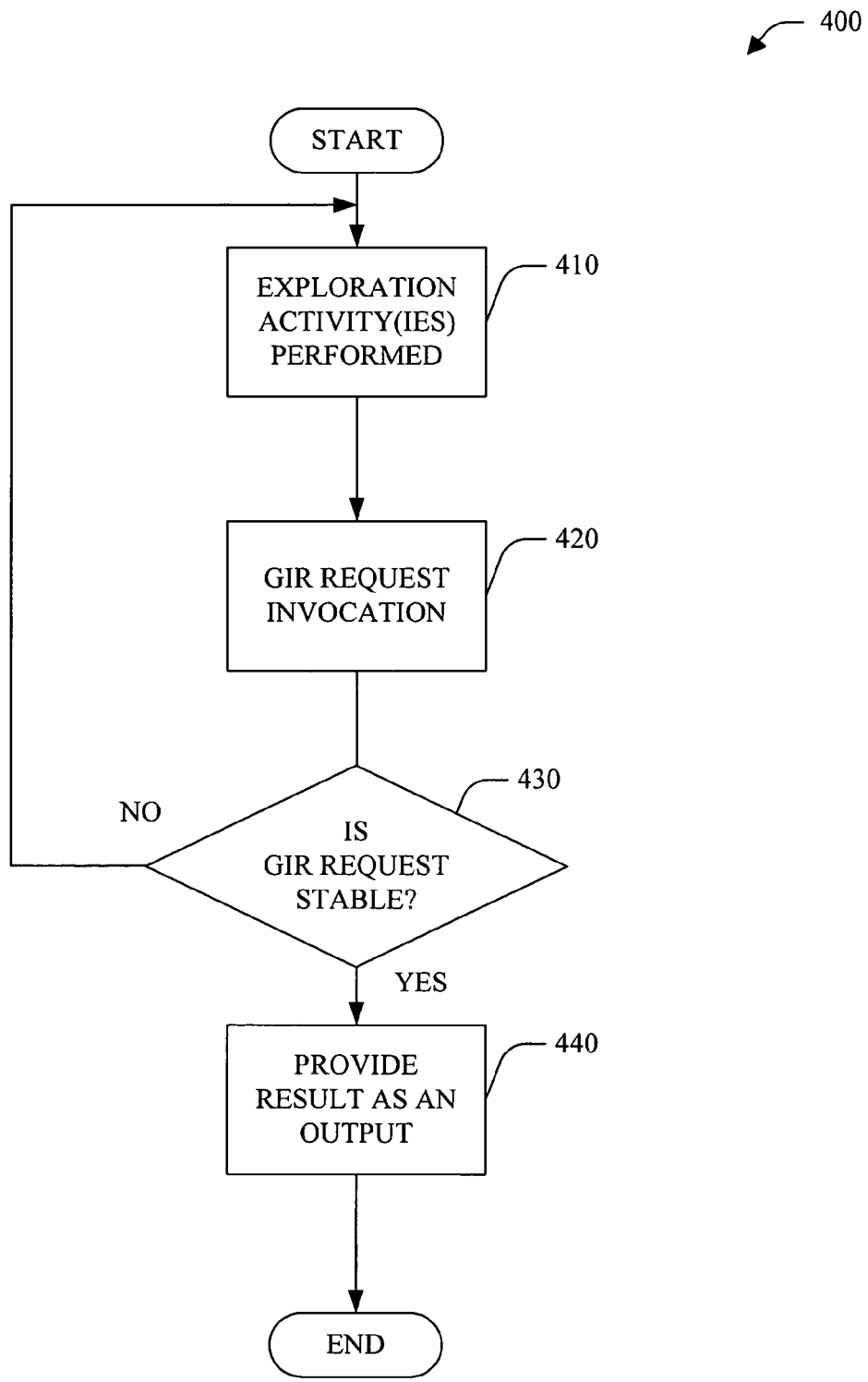
FIG. 4 is a flow chart of a methodology that facilitates a step oriented method (procedure) of a logless component.
Figure 5:
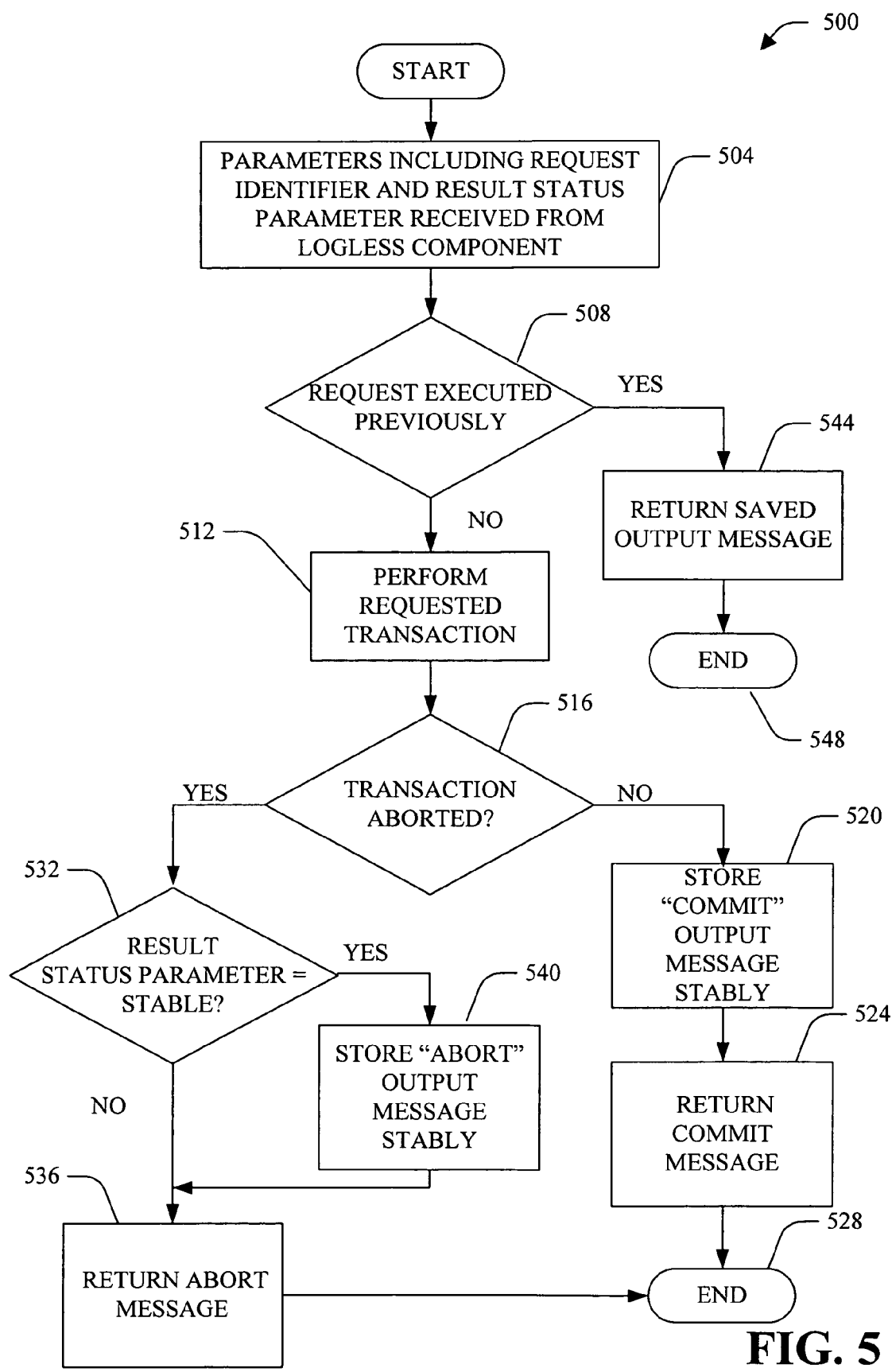
FIG. 5 is a flow chart of a methodology that facilitates the treating of aborts as exploratory activity in a middle tier logless component.

Turning briefly to FIGS. 3-5, methodologies that may be implemented in accordance with the claimed subject matter are illustrated. While, for purposes of simplicity of explanation, the methodologies are shown and described as a series of blocks, it is to be understood and appreciated that the claimed subject matter is not limited by the order of the blocks, as some blocks may, in accordance with the claimed subject matter, occur in different orders and/or concurrently with other blocks from that shown and described herein. Moreover, not all illustrated blocks may be required to implement the methodologies.

The claimed subject matter may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Referring to FIG. 3, a methodology that facilitates a generalized idempotent request 300 is illustrated. At 310, parameter(s) including a request identifier are received from a logless component. At 320, a determination is made as to whether the GIR request has been invoked for this particular request identifier. If the determination at 320 is YES, processing continues at 330.

If the determination at 320 is NO, at 340 an update action is performed that produces a result. It is this action for which exactly once execution is desired. At 350, the result is stored, for example, in a result store. At 360, the result is provided as an output, and, no further processing occurs.

At 330, a result of an original GIR request is retrieved, for example, from a result store. At 380, the result of the original GIR request is provided as an output. No further processing occurs.

Turning next to FIG. 4, a methodology that facilitates an exploratory procedure 400 is illustrated. At 410, exploratory activity(ies) are performed. At 420, an idempotent action (GIR Request) is invoked. At 430, a determination is made as to whether a result returned from the GIR request is stable. If the result returned from the GIR Request is not stable, processing continues at 410 (e.g., continues at 410 to try again). If the determination at 430 is YES, at 440 a result is provided as an output.

This template for an exploratory procedure copes with the fact that under some conditions, either the GIR request is known not to be stable, or is at least not known to be stable, then the request is re-executed until a stable GIR result has been returned. This template is suitable for dealing with the possibility of transaction aborts should the GIR request be transactional in nature.

Next, referring to FIG. 5, a methodology that permits an exploratory procedure to specify whether a stable outcome is required should the request abort 500 is illustrated. This template illustrates how a backend service can optionally provide idempotent aborts. At 504, parameter(s) including a request identifier and a result status parameter are received from a logless component. At 508, a determination is made as to whether the request has executed previously. If the determination at 508 is YES, at 544, a saved output message is returned, and, no further processing occurs.

If the determination at 508 is NO, at 512, the requested transaction is performed. At 516, a determination is made as to whether the transaction aborted. If the determination at 516 is NO, at 520, a commit output message is stored stably. Next, at 524, a commit message is returned, and, no further processing occurs.

If the determination at 516 is YES, then a determination is made at 532 as to whether an idempotent abort has been requested. If the determination at 532 is NO, processing continues at 536. If the determination at 532 is YES, at 532, a determination is made as to whether the result state parameter is set to "stable". If the determination at 540 is YES, the "abort" output message is stored stably. At 536, an abort message is returned, and, no further processing occurs.

Figure 6:
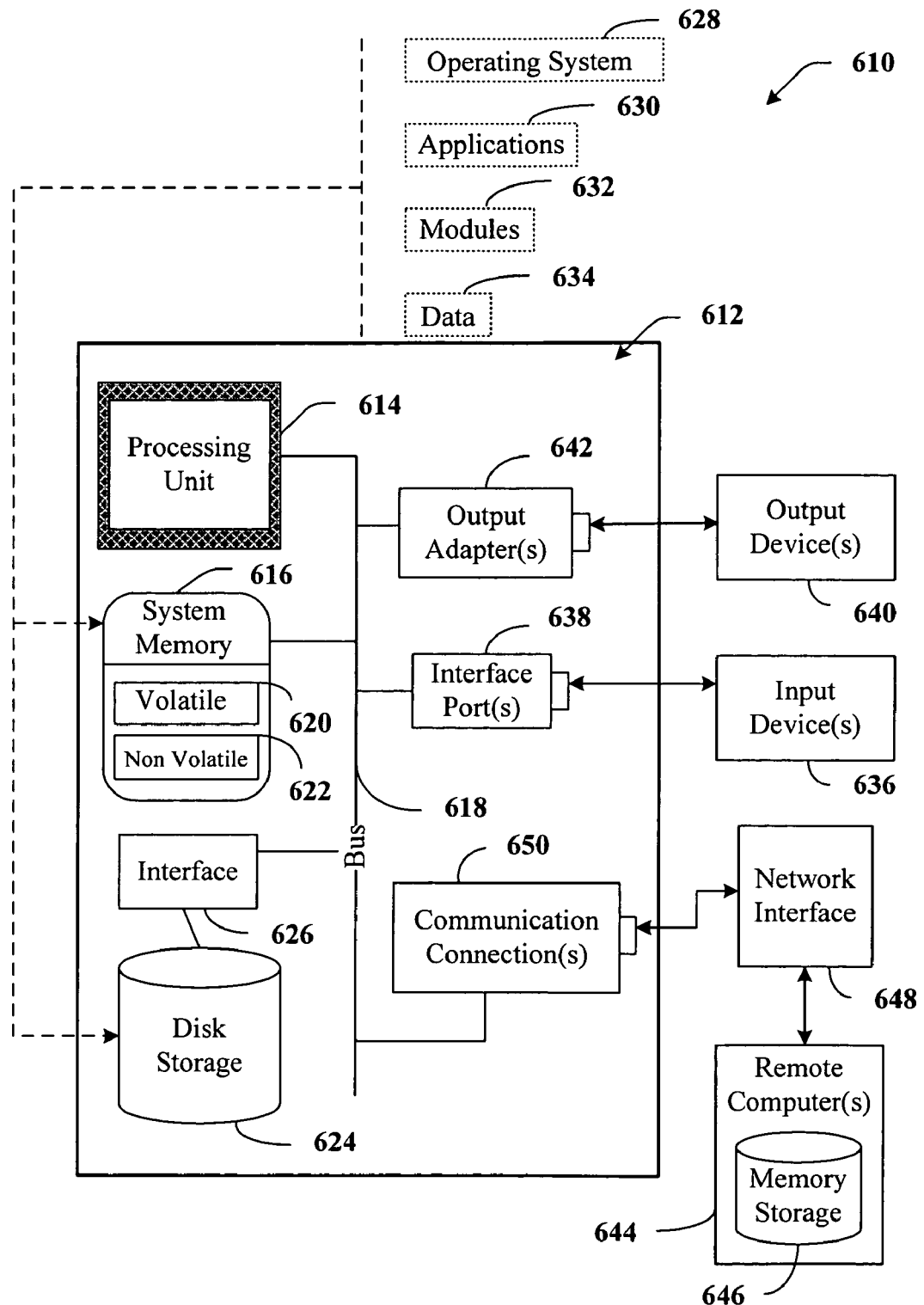
FIG. 6 illustrates an example operating environment.

In order to provide additional context for various aspects of the claimed subject matter, FIG. 6 and the following discussion are intended to provide a brief, general description of a suitable operating environment 610. While the claimed subject matter is described in the general context of computer-executable instructions, such as program modules, executed by one or more computers or other devices, those skilled in the art will recognize that the claimed subject matter can also be implemented in combination with other program modules and/or as a combination of hardware and software. Generally, however, program modules include routines, programs, objects, components, data structures, etc. that perform particular tasks or implement particular data types. The operating environment 610 is only one example of a suitable operating environment and is not intended to suggest any limitation as to the scope of use or functionality of the claimed subject matter. Other well known computer systems, environments, and/or configurations that may be suitable for use with the claimed subject matter include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 6, an exemplary environment 610 includes a computer 612. The computer 612 includes a processing unit 614, a system memory 616, and a system bus 618. The system bus 618 couples system components including, but not limited to, the system memory 616 to the processing unit 614. The processing unit 614 can be any of various available processors. Dual microprocessors and other multiprocessor architectures also can be employed as the processing unit 614.

The system bus 618 can be any of several types of bus structure(s) including the memory bus or memory controller, a peripheral bus or external bus, and/or a local bus using any variety of available bus architectures including, but not limited to, an 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 616 includes volatile memory 620 and nonvolatile memory 622. The basic input/output system (BIOS), containing the basic routines to transfer information between elements within the computer 612, such as during start-up, is stored in nonvolatile memory 622. By way of illustration, and not limitation, nonvolatile memory 622 can include read only memory (ROM), programmable ROM (PROM), electrically programmable ROM (EPROM), electrically erasable ROM (EEPROM), or flash memory. Volatile memory 620 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 612 also includes removable/nonremovable, volatile/nonvolatile computer storage media. FIG. 6 illustrates, for example a disk storage 624. Disk storage 624 includes, but is not limited to, devices like a magnetic disk drive, floppy disk drive, tape drive, Jaz drive, Zip drive, LS-100 drive, flash memory card, or memory stick. In addition, disk storage 624 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 624 to the system bus 618, a removable or non-removable interface is typically used such as interface 626.

It is to be appreciated that FIG. 6 describes software that acts as an intermediary between users and the basic computer resources described in suitable operating environment 610. Such software includes an operating system 628. Operating system 628, which can be stored on disk storage 624, acts to control and allocate resources of the computer system 612. System applications 630 take advantage of the management of resources by operating system 628 through program modules 632 and program data 634 stored either in system memory 616 or on disk storage 624. It is to be appreciated that the claimed subject matter can be implemented with various operating systems or combinations of operating systems.

A user enters commands or information into the computer 612 through input device(s) 636. Input devices 636 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 614 through the system bus 618 via interface port(s) 638. Interface port(s) 638 include, for example, a serial port, a parallel port, a game port, and a universal serial bus (USB). Output device(s) 640 use some of the same type of ports as input device(s) 636. Thus, for example, a USB port may be used to provide input to computer 612, and to output information from computer 612 to an output device 640. Output adapter 642 is provided to illustrate that there are some output devices 640 like monitors, speakers, and printers among other output devices 640 that require special adapters. The output adapters 642 include, by way of illustration and not limitation, video and sound cards that provide a means of connection between the output device 640 and the system bus 618. It should be noted that other devices and/or systems of devices provide both input and output capabilities such as remote computer(s) 644.

Computer 612 can operate in a networked environment using logical connections to one or more remote computers, such as remote computer(s) 644. The remote computer(s) 644 can be a personal computer, a server, a router, a network PC, a workstation, a microprocessor based appliance, a peer device or other common network node and the like, and typically includes many or all of the elements described relative to computer 612. For purposes of brevity, only a memory storage device 646 is illustrated with remote computer(s) 644. Remote computer(s) 644 is logically connected to computer 612 through a network interface 648 and then physically connected via communication connection 650. Network interface 648 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 650 refers to the hardware/software employed to connect the network interface 648 to the bus 618. While communication connection 650 is shown for illustrative clarity inside computer 612, it can also be external to computer 612. The hardware/software necessary for connection to the network interface 648 includes, for exemplary purposes only, internal and external technologies such as, modems including regular telephone grade modems, cable modems and DSL modems, ISDN adapters, and Ethernet cards.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented system that facilitates persistence for an execution state comprising:
   a result store that stores a result associated with a request;
   an idempotent request routine that stores a result associated with a particular request identified by a request identifier and returns the result on a subsequent call of the routine for the particular request independent of parameter(s) provided to the routine other than the request identifier; and
   each idempotent request in a calling component is within an exploratory procedure in which exploratory reads are restricted to only affecting the non-request identifier arguments of the idempotent request, and whose scope within the exploratory procedure limits their impact on the calling component to the results returned by the idempotent request.

2. The system of claim 1 parameter(s) of the subsequent call other than the request identifier are not the same as parameter(s) of an original call.

3. The system of claim 1, the request identifier deterministically fixed at initial invocation of the idempotent request routine.

4. An architecture employing the system of claim 1, the architecture including a logless component that calls the idempotent request routine, the logless component remains recoverable via replay initiated by a client.

5. The system of claim 1, the result store stores a plurality of results associated with a plurality of requests, each identified by a unique request identifier.

6. The system of claim 1, if a result for the particular request has previously been stored in the result store, the result provided by the idempotent request routine is based on what is stored in the result store, not on exploratory reads, if any, performed by the idempotent request routine.

7. The system of claim 1, the request identifier is not dependent upon results of any read interactions of an exploratory procedure that calls the idempotent request routine.

8. A back end data tier of an enterprise application architecture comprising the system of claim 1.

9. The system of claim 1, the idempotent request routine further receives a result status parameter to facilitate an idempotent request abort.

10. The system of claim 9, a logless component executes a same sequence of idempotent requests on a subsequent execution as it did for an original execution of one of its methods.

11. The system of claim 9, the idempotent request abort can be selectively enabled by an exploratory procedure that calls the idempotent request routine.

12. The system of claim 11, the result status parameter permits a caller of the routine to request that in the event the particular request involves an abort, that the abort is to be stable and idempotent.

13. The system of claim 9, a subsequent invocation of an idempotent request for a particular request which aborted results in a same return as the aborted invocation with a same abort message as the aborted invocation.

14. The system of claim 1, a calling component comprises a series of steps, with each step comprising an exploration sub-step which can include logic and examine information but does not engage in update activity, and, an action sub-step which executes exactly one idempotent interaction.

* * * * *